US011393459B2

(12) United States Patent
Chae et al.

(10) Patent No.: US 11,393,459 B2
(45) Date of Patent: Jul. 19, 2022

(54) METHOD AND APPARATUS FOR RECOGNIZING A VOICE

(71) Applicant: LG ELECTRONICS INC., Seoul (KR)

(72) Inventors: Jong Hoon Chae, Seoul (KR); Esther Park, Seoul (KR); Su Il Choe, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 16/581,105

(22) Filed: Sep. 24, 2019

(65) Prior Publication Data

US 2020/0020327 A1    Jan. 16, 2020

(30) Foreign Application Priority Data

Jun. 24, 2019 (KR) .................. 10-2019-0075028

(51) Int. Cl.
| | |
|---|---|
| *G06F 40/30* | (2020.01) |
| *G10L 15/197* | (2013.01) |
| *G10L 15/22* | (2006.01) |
| *G06F 40/295* | (2020.01) |
| *G06F 40/268* | (2020.01) |

(Continued)

(52) U.S. Cl.
CPC .......... *G10L 15/197* (2013.01); *G06F 40/268* (2020.01); *G06F 40/295* (2020.01); *G06F 40/30* (2020.01); *G10L 15/22* (2013.01); *G06F 16/24534* (2019.01); *G06F 16/90324* (2019.01); *G06F 40/205* (2020.01);

(Continued)

(58) Field of Classification Search
None
See application file for complete search history.

(56) References Cited

U.S. PATENT DOCUMENTS 9,037,464 B1 * 5/2015 Mikolov ................. G10L 15/06
704/255
9,734,193 B2 * 8/2017 Rhoten .............. G06F 16/90332
(Continued)

FOREIGN PATENT DOCUMENTS

| KR | 1020080024911 | 3/2008 |
|---|---|---|
| KR | 100918644 | 9/2009 |

*Primary Examiner* — Richard Z Zhu
(74) *Attorney, Agent, or Firm* — Lee Hong Degerman Kang & Waimey

(57) ABSTRACT

Disclosed are a speech recognition device and a speech recognition method which perform speech recognition by executing an artificial intelligence (AI) algorithms and/or a machine learning algorithm installed thereon, to communicate with other electronic devices and an external server in a 5G communication environment. The speech recognition method according to an embodiment of the present disclosure may include converting a series of spoken utterance signals to a text item, extracting a discordant named-entity that is discordant with a parent domain inferred form the text, calculating probabilities of candidate words associated with the discordant named-entity based on calculated distances between a term representing the parent domain and each candidate word associated with the discordant named-entity, and based on the calculated probabilities, modifying the discordant named-entity in the text to one of the candidate words associated with the discordant named-entity.

7 Claims, 6 Drawing Sheets

(51) Int. Cl.
*G10L 15/18* (2013.01)
*G06F 40/205* (2020.01)
*G06F 16/2453* (2019.01)
*G06F 16/9032* (2019.01)

(52) U.S. Cl.
CPC ...... *G10L 15/1815* (2013.01); *G10L 15/1822* (2013.01); *G10L 2015/223* (2013.01)

(56) References Cited

U.S. PATENT DOCUMENTS

| | | | |
|---|---|---|---|
| 9,922,642 B2* | 3/2018 | Pitschel | G10L 15/063 |
| 10,289,957 B2* | 5/2019 | Meij | G06N 7/005 |
| 2012/0253792 A1* | 10/2012 | Bespalov | G06F 16/353 |
| | | | 704/9 |
| 2014/0136184 A1* | 5/2014 | Hatsek | G06F 40/295 |
| | | | 704/9 |
| 2017/0011289 A1* | 1/2017 | Gao | G06F 40/268 |
| 2017/0286397 A1* | 10/2017 | Gonzalez | G06F 40/35 |
| 2018/0075013 A1* | 3/2018 | Razack | G06F 40/295 |
| 2018/0189265 A1* | 7/2018 | Chen | G06N 7/005 |
| 2019/0220749 A1* | 7/2019 | Feng | G06F 40/295 |
| 2020/0380077 A1* | 12/2020 | Ge | G06F 16/3344 |
| 2020/0380991 A1* | 12/2020 | Ge | G06F 40/279 |

* cited by examiner

METHOD AND APPARATUS FOR RECOGNIZING A VOICE

CROSS-REFERENCE TO RELATED APPLICATION

Pursuant to 35 U.S.C. § 119(a), this application claims the benefit of earlier filing date and right of priority to Korean Patent Application No. 10-2019-0075028, filed on Jun. 24, 2019, the contents of which are hereby incorporated by reference herein in its entirety.

BACKGROUND

1. Technical Field

The present disclosure relates to a method and device for speech recognition. More specifically, the present disclosure relates to a method and device for speech recognition, in which speech recognition accuracy is improved by modifying a named-entity discordant with a parent domain in the converted text item of a spoken utterance according to results of calculating probabilities on the basis of word embeddings.

2. Description of the Related Art

As technologies have advanced, various services using a speech recognition technology have been introduced into numerous fields. A speech recognition technology may be referred to as a series of processes for understanding a speech uttered by a person and converting the speech to text information manageable by a computer. Likewise, a speech recognition service using such a speech recognition technology may include a series of processes for recognizing user's speech and providing an appropriate service corresponding to said speech.

In particular, Related Art 1 and Related Art 2 disclose a technology that when converting a received speech to text, calculates probabilities with respect to candidate words matching the received speech, and then selects the candidate word with a high probability and displays the same as text.

In particular, Related Art 1 discloses a technology that corrects errors by a statistical error correction process that produces a plurality of candidate sentences and as a post-processing process, selects the candidate sentence made of a string of candidate words that has the optimal coupling relationship; however, this technology is limited in terms of improving the accuracy of speech recognition through modifying named-entities discordant with the parent domain that exist in the sentence.

In particular, Related Art 2 discloses a technology by which a device, when having a conversation as a speaker or listener with a conversation partner, collects and interconnects sentences and words actually used in the conversation to generate dialog sentences, and by modifying and expanding the meaning of the words, outputs appropriate sentences on behalf of the device and the conversation partner; however, this technology is limited in terms of improving the accuracy of speech recognition by modifying named-entities discordant with the parent domain in the sentence.

The background art described above may be technical information retained by the present inventors in order to derive the present disclosure, or acquired by the present inventors in the process of deriving the present disclosure, and thus is not necessarily a known art disclosed to the general public before the filing of the present application.

RELATED ART DOCUMENTS

Patent Documents

Related Art 1: Korean Patent Laid-Open Publications No. 10-2008-0024911 (published on Mar. 19, 2008)
Related Art 2: Korean Patent Laid-Open Publications No. 10-0918644 (published on Sep. 16, 2009)

SUMMARY OF THE INVENTION

One aspect of the present disclosure is to enable modification of a named-entity discordant with the parent domain in a sentence.

Another aspect of the present disclosure is to enable modification of a named-entity discordant with the parent domain in a sentence according to probabilities calculated on the basis of word embeddings.

Another aspect of the present disclosure is to enable modification of a named-entity discordant with the parent domain in a sentence, by using optimal processor resources.

Another aspect of the present disclosure is to improve speech recognition processing performance by modifying a named-entity discordant with the parent domain in a sentence.

Further scope of applicability of the present disclosure will be apparent from the above detailed description. It should be understood, however, that specific examples, such as the detailed description and the preferred embodiments of the present disclosure, are given by way of illustration only, since various changes and modifications within the spirit and scope of the present disclosure will become apparent to those skilled in the art.

A speech recognition method according to an embodiment of the present disclosure may include modifying a named-entity in a spoken sentence that is discordant with the parent domain according to the probability calculated on the basis of word embeddings.

More specifically, the speech recognition method according to an embodiment of the present disclosure may include: converting a series of spoken utterance signals to a text item; extracting a discordant named-entity discordant with a parent domain inferred from the text item; based on calculated distances between a term representing the parent domain and the discordant named-entity, calculating probabilities with respect to candidate words of the discordant named-entity; and based on the calculated probabilities, modifying the discordant named-entity in the text item to one candidate word selected from the candidate words associated with the discordant named-entity.

Thus, through the speech recognition method according to the present embodiment, a named-entity in a sentence (text) that is discordant with the parent domain can be modified, resulting in improvements in speech recognition processing performance.

Further, the converting may include: by using an acoustic model and a language model, analyzing the pronunciation and context of a word included in a spoken utterance to extract candidate words; calculating the probability of concordance between the word included in the spoken utterance and each candidate word; and selecting the candidate word with the highest probability of concordance from among the candidate words to convert to a text item.

Through the converting according to the present embodiment, the spoken utterance can be more accurately converted to the text item by using the acoustic model and the language model.

Further, the extracting may include analyzing one or more main named-entities from the text item to infer a parent domain with respect to the text item; and from the one or more main named-entities, extracting, as a discordant named-entity, a main named-entity that is not concordant with a context of the parent domain. Further, the extracting may include comparing the one or more main named-entities to a word in a vocabulary of the parent domain to extract, as the discordant named-entity, a main named-entity that is not included in the vocabulary of the parent domain.

Through the extracting according to the present embodiment, the parent domain may be accurately analyzed by discerning the meaning of a word included in the text item, and the discordant named-entity discordant with the parent domain may be extracted using the vocabulary of the parent domain, resulting in improvements in speech recognition processing performance.

Also, the calculating may include calculating a distance between the term representing the parent domain and each candidate word associated with the discordant named-entity in a vector space generated by a word embedding method; calculating, according to the calculated distance, a weight value of each candidate word associated with the discordant named-entity; and calculating an adjusted probability of each candidate word associated with the discordant named-entity by applying the weight value of a corresponding candidate word associated with the discordant named-entity.

Through the calculating according to the present embodiment, the probability of the discordant named-entity can be adjusted by the word-embedding method, thus reducing the computational load required for speech recognition and increasing the flexibility enabling accurate word recognition.

Further, the modifying may include modifying the discordant named-entity in the text item to a candidate word associated with the discordant named-entity with the highest adjusted probability.

Through the modifying according to the present embodiment, errors in speech recognition can be reduced, thus resulting in improvements in speech recognition processing performance.

According to an embodiment of the present disclosure, the speech recognition device may include: a converter configured to convert a series of spoken utterance signals to a text item; a first processor configured to extract a named-entity discordant with a parent domain inferred from the text item; a second processor configured to, on the basis of a calculated distance between each candidate word associated with the discordant named-entity and a term representing the parent domain, calculate a probability with respect to each candidate word associated with the discordant named-entity; and a selector configured to, on the basis of the calculated probability, modify the discordant named-entity in the text item to one candidate word from among the candidate words associated with the discordant named-entity.

The speech recognition device according to the present embodiment enables modification of a named-entity in a sentence (text) that is discordant with the parent domain, thus resulting in improvements in speech recognition processing performance.

Further, the converter may include: a first analyzer configured to analyze the pronunciation and context of a word included in a spoken utterance by using an acoustic model and a language model, to extract candidate words; a first calculator configured to calculate the probability of concordance between the word included in the spoken utterance and each candidate word; and a determiner configured to determine, from among the candidate words, a candidate word with the highest probability of concordance and convert the candidate word with the highest probability of concordance to a text item.

According to the present embodiment, the converter may convert the spoken utterance to a text item more accurately by using the acoustic model and the language model.

Furthermore, the first processor may include a second analyzer configured to analyze one or more main named-entities from the text item to infer a parent domain with respect to the text item; and an extractor configured to extract, as a discordant named-entity, from the one or more main named-entities, a main named-entity that is not concordant with a context of the parent domain. The extractor may compare the one or more main named-entities to a word in a vocabulary of the parent domain and extract, as a discordant named-entity, a main named-entity that is not included in the vocabulary of the parent domain.

Through the first processor according to the present embodiment, the parent domain may be accurately analyzed by discerning the meaning of the word included in the text item, and, a discordant named-entity discordant with the parent domain may be extracted using the vocabulary of the parent domain, thus improving speech recognition processing performance.

Furthermore, the second processor may include: a second calculator configured to calculate a distance between a term representing the parent domain and each candidate word associated with the discordant named-entity in a vector space generated by a word embedding method; a third calculator configured to calculate, according to the calculated distance, a weight value of each candidate word associated with the discordant named-entity; and a fourth calculator configured to calculate an adjusted probability of each candidate word associated with the discordant named-entity by applying the weight value of a corresponding candidate word associated with the discordant named-entity.

The second processor according to the present embodiment allows the probability of the discordant named-entity to be adjusted by the word embedding method, thereby reducing the computational load required for speech recognition and increasing the flexibility enabling accurate word recognition.

Furthermore, the selector may modify the discordant named-entity in the text item to a candidate word associated with the discordant named-entity that has the highest adjusted probability.

Through the selector according to the present embodiment, errors in speech recognition may be reduced, thus producing improvements in speech recognition processing performance.

According to the present disclosure, speech recognition processing performance can be improved by modifying a named-entity in a sentence that is discordant with a parent domain.

In detail, speech recognition processing performance can be improved by modifying the named-entity in the sentence that is discordant with the parent domain according to a probability calculated by a word embedding method.

In addition, a speech recognition device according to the present disclosure, in spite of being a uniform mass-produced product, allows a user to perceive the speech recognition device as a personalized device, thus creating the effect of a user-customized product.

In addition, in various services provided through speech recognition, the present disclosure can increase user satisfaction and execute rapid and accurate speech recognition processing.

In addition, the present disclosure enables, by using optimal processor resources, a voice command intended by a user to be recognized and processed, thereby improving energy efficiency of the speech recognition device.

In addition to the aforementioned, other processes and systems for implementing the present disclosure, and computer programs for implementing such processes may be further provided.

Aspects, features, and advantages of the present disclosure other than the aforementioned will be more apparent with reference to the accompanying drawings, the appended claims, and the detailed description of embodiments.

Advantages of the present disclosure are not limited to the above-described, and other advantages unmentioned may be clearly understood by a person skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION OF THE INVENTION

Figure 1:
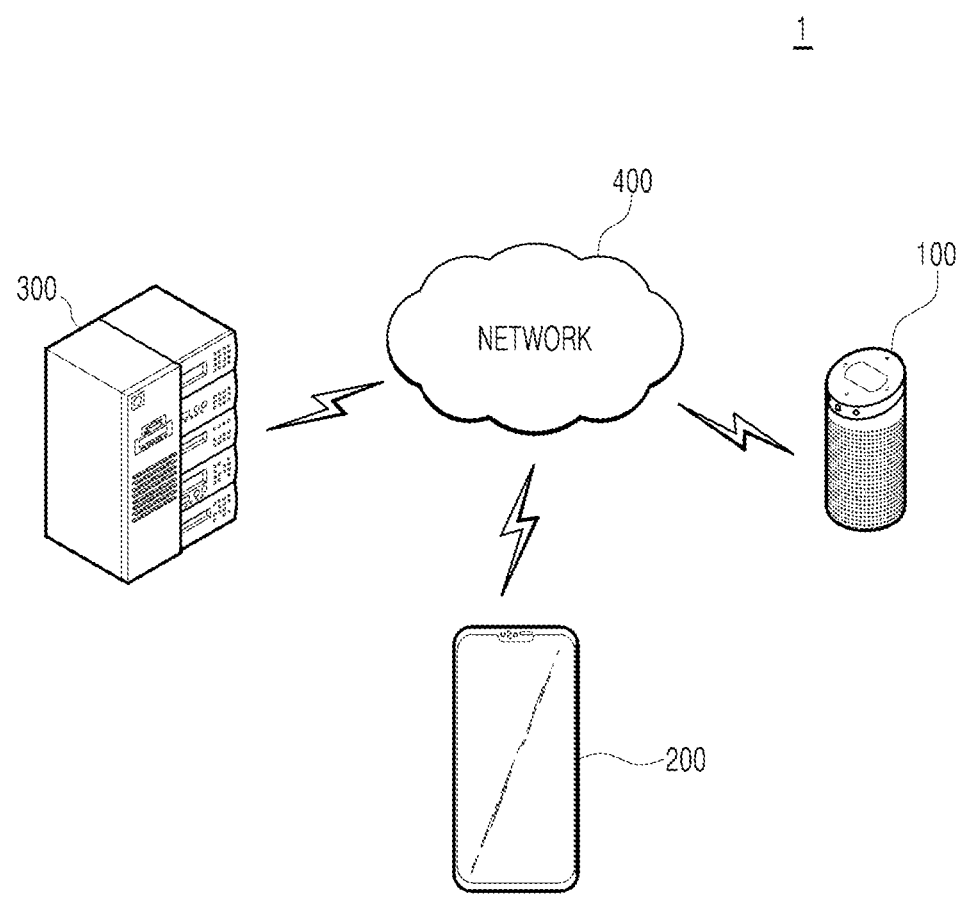
FIG. 1 is a diagram illustrating an example of a speech recognition environment according to an embodiment of the present disclosure, including a speech recognition device, a user terminal, a server, and a network connecting the speech recognition device, the user terminal, and the server to one another.

Advantages and features of the present disclosure and methods of achieving the advantages and features will be more apparent with reference to the following detailed description of embodiments in connection with the accompanying drawings. However, the description of particular embodiments is not intended to limit the present disclosure to the particular embodiments disclosed herein, but on the contrary, it should be understood that the present disclosure is to cover all modifications, equivalents and alternatives falling within the spirit and scope of the present disclosure. The embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if so deemed that such details are not necessary to obtain a complete understanding of the present disclosure.

The terminology used herein is used for the purpose of describing particular embodiments, and is not intended to limit the scope of the present disclosure. The singular forms include the plural references unless the context clearly dictates otherwise. Throughout the present specification, the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components. The terms such as "first," "second," and other numerical terms may be used herein only to describe various elements, but these elements should not be limited by these terms. These terms such as "first," "second," and other numerical terms, are used only to distinguish one element from another element.

Hereinbelow, the embodiments of the present disclosure will be described in greater detail with reference to the accompanying drawings, and on all these accompanying drawings, the identical or analogous elements are designated by the same reference numeral, and repetitive description of the common elements will be omitted.

FIG. 1 is a diagram illustrating an example of a speech recognition environment according to an embodiment of the present disclosure, including a speech recognition device, a user terminal, a server, and a network connecting the speech recognition device, the user terminal, and the server to one another.

FIG. 1 illustrates a state in which a speech recognition device 100, a user terminal 200, and a server 300 are communicatively connected to one another via a network 400. The speech recognition device 100 includes a communicator (110 in FIG. 3) that enables to transmit and receive data to and from the server 300 and the user terminal 200 corresponding to a personal communication device via the network 400, which may be wire-based or wireless.

The speech recognition device 100, the user terminal 200, and the server 300 may be connected to one another in a 5G communication environment.

In addition to the devices illustrated in FIG. 1, various other electronic devices, which can be used around the home or office, may be connected to one other and operated in an Internet-of-Things environment.

The speech recognition device 100 may receive, recognize, and analyze a user's spoken utterance to provide a speech recognition service. The speech recognition device 100 may include an artificial intelligence (AI) speaker and act as a hub controlling electronic devices not provided with speech input/output functionality.

Here, the spoken utterance may contain an activation word and a spoken sentence. The activation word is a designated command that activates the speech recognition function of the speech recognition device 100 and is herein referred to as "wake-up word". The speech recognition function is activated only when the wake-up word is present in the spoken utterance, and therefore, when the spoken utterance does not contain the wake-up word, the speech recognition function remains inactive (for example, in a sleep mode). Such a wake-up word may be preset and stored in a memory (160 in FIG. 3) that will be described later.

In detail, the spoken sentence refers to the portion of the spoken utterance that is processed after the speech recognition function is activated, and may include a voice command that the speech recognition device 100 can actually process and generate an output from. For example, when the spoken utterance is "Eeoseutaya eeokeoneul kyeojwo (Airstar, turn on the air conditioner)", the wake-up word in this case would be "Eeoseutaya (Airstar)", and the spoken sentence would be "eeokeoneul kyeojwo (turn on the air conditioner)". In this case, the speech recognition device 100 may receive and analyze the spoken utterance, determine whether the wake-up word is present therein, and execute the spoken sentence, thereby controlling an air conditioner (not illustrated) as an electronic device.

In the present embodiment, the spoken sentence may be a unit for containing a single voice command. In a spoken sentence containing a single voice command, the wake-up word may be positioned before the spoken sentence, may be positioned after the spoken sentence, or may be positioned within the spoken sentence. When the wake-up word is positioned within the spoken sentence, the spoken sentence may contain two or more spoken segments. For example, when the spoken utterance is "Eeokeoneul eeoseutaya kyeojwo (Turn on, Airstar, the air conditioner)", the wake-up word "eeoseuta (Airstar)" is positioned within the spoken sentence "Eeokeoneul kyeojwo (Turn on the air conditioner)". In this case, the spoken sentence may include a first spoken segment "Eeokeoneul (the air conditioner)" preceding the wake-up word, and a second spoken segment "kyeojwo (turn on)" following the wake-up word. Excluding the wake-up word positioned within the spoken sentence, the first spoken segment preceding the wake-up word and the second spoken segment following the wake-up word may be combined to form the spoken sentence which serves as a single voice command.

In some embodiments, the spoken sentence may include two or more voice commands. When the spoken sentence contains two or more voice commands, the wake-up word may be positioned between a first spoken sentence and a second spoken sentence; may be positioned before the first spoken sentence; may be positioned after the first spoken sentence (thereby preceding the second spoken sentence); may be positioned within the first spoken sentence; may be positioned after the second spoken sentence; or may be positioned within the second spoken sentence. For example, when the spoken utterance is "Eeokeoneul kyeojwo eeoseutaya geurigo cheongjeong modeuro unjeonhaejwo (Turn on the air conditioner, Airstar, and drive it in clean mode)", the wake-up word "eeoseuta (Airstar)" is positioned between the first spoken sentence "Eeokeoneul kyeojwo (turn on the air conditioner)" and the second spoken sentence "geurigo cheongjeong modeuro unjeonhaejwo (and drive it in clean mode)". Excluding the wake-up word positioned between the two spoken sentences, the first spoken sentence preceding the wake-up word and the second spoken sentence following the wake-up word may be individually processed, and processing results thereof may be outputted; or the first spoken sentence preceding the wake-up word and the second spoken sentence following the wake-up word may be batch processed, and processing results thereof may be outputted.

In the present embodiment, the speech recognition device 100 may convert the spoken utterance to a text item and extract a discordant named-entity which is discordant with a parent domain inferred from the converted text item. On the basis of calculated distances between the term representing the parent domain and each candidate word associated with the discordant named-entity, the speech recognition device 100 may calculate probabilities with respect to the candidate words associated with the discordant named-entity, and on the basis of the calculated probabilities, may modify the discordant named-entity in the text item to one candidate word from among the candidate words associated with the discordant named-entity.

In the present embodiment, the spoken utterance signals may include a spoken utterance serving as a voice command for when the speech recognition function is activated after successful recognition of the wake-up word. Further, in the present embodiment, the spoken utterance signals may include a spoken utterance freely uttered by a user, not necessarily serving as a voice command for when the speech recognition function is activated after successful recognition of the wake-up word. Furthermore, in the present embodiment, the spoken utterance signals may include a wake-up word and a spoken sentence in unrecognized states.

The user terminal 200 may control driving of the speech recognition device 100 through the server 300. Furthermore, the user terminal 200 may receive, from the speech recognition device 100, various messages regarding the operation of the speech recognition device 100. Types of such messages include, but are not limited to, notification messages indicating the start and/or end of speech recognition processing of the speech recognition device 100, alarm messages indicating the occurrence of an anomalous situation within the speech recognition device 100, and so forth. These notification messages and/or alarm messages may be simultaneously transmitted and outputted through a user interface (not illustrated) of the speech recognition device 100 and the user terminal 200.

The user terminal 200 may include but is not limited to a communication terminal capable of performing the functions of a computing device (not illustrated), and includes, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Furthermore, the user terminal 200 may be a wearable terminal implemented with a communication function and a data processing function, in the form of a watch, glasses or goggles, a hairband, a ring, or the like. The user terminal 200 is not limited to the aforementioned items and may be any terminal capable of web-browsing.

The server 300 may be a database server which provides big data required for applications of various artificial intelligence algorithms, data on speech recognition, and the like. Furthermore, the server 300 may include a web server or application server enabling a remote control over the speech recognition device 100 by using an application or web-browser installed on the user terminal 200.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

Also, AI does not exist on its own, but is rather directly and indirectly linked to a number of other fields in computer science. Particularly in recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that studies and builds systems capable of learning, making predictions, and enhancing its own performance on the basis of experiential data, and algorithms for such systems. Machine learning algorithms, rather than executing rigidly set static program commands, may take an approach that builds models for deriving predictions or decisions based on inputted data.

The server 300 may convert a series of spoken utterance signals received from the speech recognition device 100 to a text item, and extract a discordant named-entity discordant with a parent domain inferred from the converted text item, and based on distances between a term representing the parent domain and candidate words associated with the discordant named-entity, calculate probabilities with respect to the candidate words associated with the discordant named-entity, and based on the calculated probabilities, modify the discordant named-entity in the text item to one candidate word from among the candidate words associated with the discordant named-entity, and transfer the selection result to the speech recognition device 100. That is, a speech recognition processing process may be executed by the server 300.

Depending on the processing capability of the speech recognition device 100, the previously described conversion to text, extraction of discordant named-entity, probability calculation, and candidate word selection may be at least in part executed by the speech recognition device 100.

The network 400 may serve to connect the speech recognition device 100 and the user terminal 200 to each other. The network 400 includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. In addition, the network 400 may transmit or receive data using short-range communication and/or long-range communication technologies. Examples of the short-range communication technologies may include Bluetooth, radio frequency identification (RFID), infrared data association (IrDA), ultra-wideband (UWB), ZigBee, and wireless fidelity (Wi-Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include connections of network elements, such as hubs, bridges, routers, switches, gateways, and so forth. The network 400 may include a public network such as the Internet, and a private network such as an organization's secured private network, and may also include one or more connected networks as in a multi-network condition. Access to the network 400 may be provided through one or more wire-based or wireless access networks. Furthermore, the network 400 may support an Internet of Things (IoT) network which exchanges and processes information between individual components such as objects and/or 5G communication.

Figure 2:
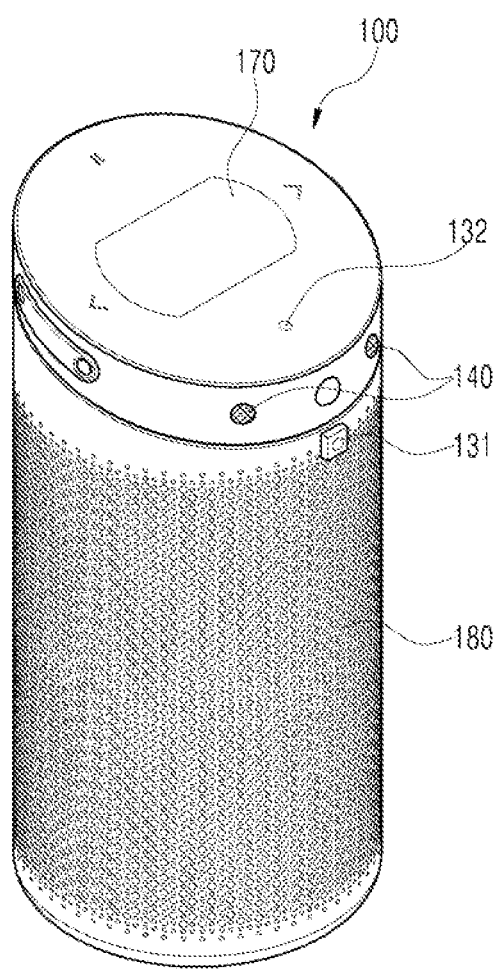
FIG. 2 is a diagram illustrating an example of the outer appearance of a speech recognition device according to an embodiment of the present disclosure.
Figure 3:
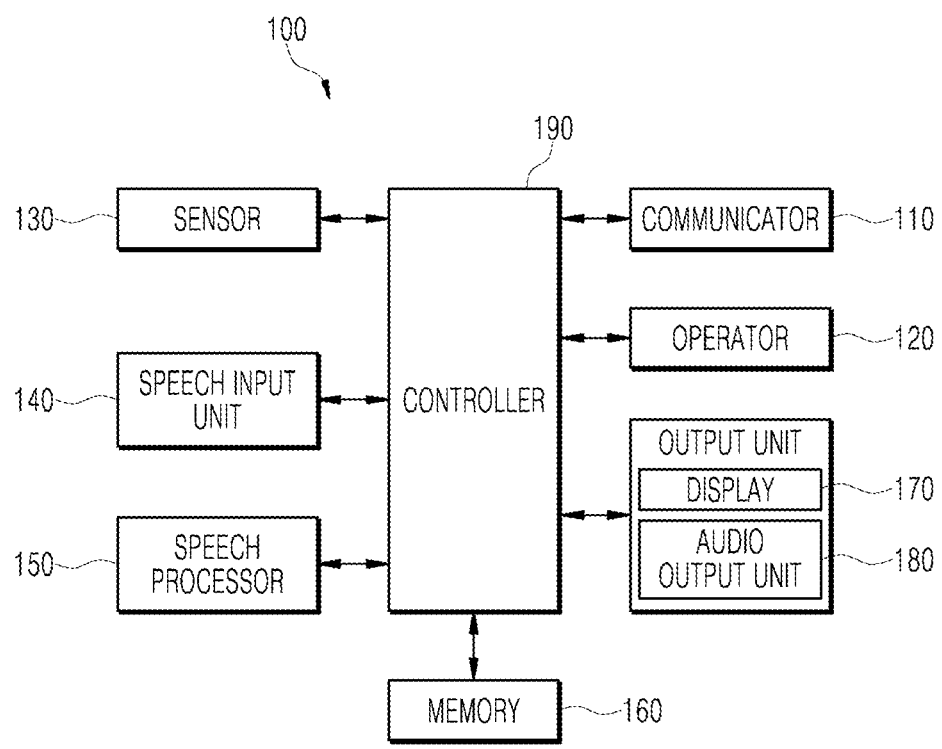
FIG. 3 is a schematic block diagram of a speech recognition device according to an embodiment of the present disclosure.

FIG. 2 is a diagram illustrating an example of the outer appearance of a speech recognition device according to an embodiment of the present disclosure, and FIG. 3 is a schematic block diagram illustrating a speech recognition device according to an embodiment of the present disclosure. Hereinbelow, a description of the parts previously described with reference to FIG. 1 will be omitted to avoid repetitive description. Referring to FIG. 2 and FIG. 3, the speech recognition device 100 may include a communicator 110, an operator 120, a sensor 130 including a proximity sensor 131 and an image sensor 132, an audio input unit 140, a speech processor 150, a memory 160, a display 170, an audio output unit 180, and a controller 190.

The communicator 110 may provide, in connection with the network 400, a communication interface required to provide transmission/reception signals as packet data between the speech recognition device 100 and other electronic devices and/or the user terminal 200. Furthermore, the communicator 110 may receive a predetermined information request signal from the electronic device and/or the user terminal 200, and may transmit to the electronic device and/or the user terminal 200 the information processed by the speech recognition device 100. The communicator 110 may be a device which includes the hardware and software required for transmission/reception of signals such as control signals, data signals, and so forth, with other network devices through wire-based or wireless connections.

In the present embodiment, other electronic devices may refer to a home appliance not provided with speech input/output functionality, for example, an air conditioner, a refrigerator, a laundry machine, or the like, wherein said home appliance may be controlled by using the speech recognition device 100. Alternatively, the other electronic devices may be a home appliance which has speech input/output functionality, that is, the function of the speech recognition device 100.

The operator 120 may have a plurality of operable buttons (not illustrated) and may transmit to the controller 190 the signal corresponding to an operated button. In the present example embodiment, the operator 120 may include first to fourth contact switches (not illustrated) wherein the exact process of processing an output signal by each contact switch may be determined by a program prestored in the memory 160. For example, menu items displayed on the display 170 in left and right directions may be selected by an operation signal from the first contact switch or the second contact switch; and menu items displayed on the display 170 in upward and downward directions may be selected by an operation signal from the third contact switch or the fourth contact switch. Also, the speech recognition function may be activated by operating one of the first to fourth contact switches.

The sensor 130 may include the image sensor 132 and the proximity sensor 131 configured to sense a surrounding condition around the speech recognition device 100. For example, the proximity sensor 131 may acquire location data of an object (for example, a user) located around the speech recognition device 100 by using far-infrared rays or the like. Furthermore, the user location data acquired by the proximity sensor 131 may be stored in the memory 160.

The image sensor 132 may include a camera (not illustrated) capable of capturing an image of the surrounding of the speech recognition device 100, and for image-capturing efficiency, a plurality of cameras may be provided therein. For example, each camera may include an image sensor (for example, a CMOS image sensor) which includes at least one optical lens and a plurality of photodiodes (for example, pixels) that form an image by using the light passed through the optical lens, and may include a digital signal processor (DSP) for forming an image based on signals outputted from the photodiodes. The digital signal processor may generate not only a static image, but also a dynamic image formed by frames of static images. Furthermore, an image captured and acquired by a camera serving as the image sensor 132 may be stored in the memory 160.

Although the sensor 130 is limited to the proximity sensor 131 and the image sensor 132 in the present example embodiment, the sensor 130 may also include various other sensors, such as a temperature sensor, a humidity sensor, a vibration sensor, etc., each capable of sensing a surrounding condition around the speech recognition device 100. Furthermore, the information detected by the sensor 130 may be stored in the memory 160.

The speech input unit 140 may receive a spoken utterance which a user has uttered towards the speech recognition device 100. To this end, the speech input unit 140 may be provided with one or more microphones (not illustrated). Also, to enable more accurate reception of the spoken utterance, the speech input unit 140 may be provided with a plurality of microphones (not illustrated). Here, the plurality of microphones may be disposed in different locations, spaced apart from each other, and may process the received spoken utterance signals into electric signals.

In some embodiments, the speech input unit 140 may use various noise removal algorithms for removing the noise generated while receiving the spoken utterance. In some embodiments, the speech input unit 140 may include various components for processing speech signals. For example, the speech input unit 140 may include a filter (not illustrated) for removing the noise upon receiving a spoken utterance from a user, an amplifier (not illustrated) for amplifying signals outputted from the filter and outputting the amplified signals.

The speech processor 150 may convert a series of spoken utterance signals inputted through the speech input unit 140 to a text item, and may extract a named-entity discordant with the parent domain inferred from the converted text item. On the basis of calculated distances between the term representing the parent domain and candidate words associated with the discordant named-entity, the speech processor 150 may calculate a probability with respect to each candidate word associated with the discordant named-entity, and on the basis of the calculated probability, may modify the discordant named-entity in the text item to one candidate word from among the candidate words associated with the discordant named-entity. Subsequently, the controller 190 may control such that a spoken sentence that corresponds to a result of text modification processed by the speech processor 150 can be executed, and a result thereof may be outputted through the display 170 and/or the audio output unit 180. Hereinbelow, the speech processor 150 will be described in greater detail with reference to FIG. 4 and FIG. 5.

The memory 160 may include a volatile or non-volatile recording medium and may have recorded therein various data required to operate the speech recognition device 100. The recording medium is configured to store data readable by the controller 190, and may include a hard disk drive (HDD), solid state disk (SSD), silicon disk drive (SDD), ROM, RAM, CD-ROM, a magnetic tape, a floppy disk, a light data storage device, and the like. In the present embodiment, the information stored in the memory 160 is described according to the context of each scenario.

The memory 160 may store therein limited data. For example, a preset wake-up word to be used in determining the presence of a wake-up word in the spoken utterance may be stored in the memory 160. Here, the wake-up word may be set by the manufacturer. For instance, "Eeoseuta (Airstar)" may be set as the wake-up word, and may be later modified by a user.

The processing results of a spoken sentence processed by the controller 190 may be outputted through an output unit, wherein the output unit may include the display 170 and the audio output unit 180. The display 170 may display, as image, processing results, operation mode, operation status, error status, etc. that correspond to the spoken sentence within the spoken utterance. In some embodiments, the display 170 may include a touchscreen which forms an interlayer structure with a touchpad. In this case, the display 170 may be utilized, not only as an output device, but also as an input device through which data can be inputted by a user's touch.

The display 170 may display the operation mode, current status, and setting items of the speech recognition device 100 as various visual images, letters, numbers, and symbols, and as graphic images such as icons. The display 170 may display information that corresponds to each stage of the process of processing speech input.

The audio output unit 180 may output audio signals, and more specifically, under control of the controller 190, may output the following as audio: notification messages associated with an alarm sound, an operation mode, an operation state, an error status, and the like; information corresponding to a spoken sentence of a user; and processing results corresponding to a spoken sentence of a user, and the like. The audio output unit 180 may convert electric signals from the controller 190 into audio signals and output the converted audio signals. To this end, the audio output unit 152 may be provided with a speaker (not illustrated) or the like.

The controller 190 may control such that the display 170 provide visual information corresponding to each stage of a speech recognition method and a process of controlling the electronic device, and may control such that the audio output unit 180 provide audio information corresponding to each stage of a speech recognition method and a process of controlling the electronic device. In the present embodiment, the controller 190 may control such that the processing results of a spoken sentence isolated by the speech processor 150 is outputted through the display 170 and/or the audio output unit 180.

The controller 190 may be a central processing unit capable of providing various functions such as driving a control software installed in the memory 160, causing the display 170 and/or the audio output unit 180 to output the processing results of a spoken sentence, and other various functions. Here, the controller 190 may include devices capable of processing data, such as a processor. Here, the 'processor' refers to a data processing device embedded in hardware, which has a physically structured circuit to perform functions represented as a code or command in programs. Examples of the data processing device embedded in hardware include processing devices such as a microprocessor, a central processing unit (CPU), a processor core, a multiprocessor, an application-specific integrated circuit (ASIC), a field programmable gate array (FPGA), etc., but the scope of the present disclosure is not limited thereto.

In the present embodiment, the speech recognition device 100 may perform machine learning such as deep learning on spoken utterance signals from a user, and the memory 160 may store therein the data to be used in machine learning, result data, and the like.

Deep learning, which is a subfield of machine learning, enables data-based learning to a deep level through multiple layers. As the number of layers in deep learning increases, the deep learning may acquire a collection of machine learning algorithms for extracting core data from a plurality of data sets.

Deep learning structures may include an artificial neural network (ANN), and may include a convolutional neural network (CNN), a recurrent neural network (RNN), a deep belief network (DBN), and the like. The deep learning structure in the present embodiment may employ any one of structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. DBN includes a deep learning structure formed by building up multiple layers of restricted Boltzmann machines (RBM), which is a deep learning technique. Once an N number of layers are formed by repeating RBM training, a DBN having said N number of layers may be formed. CNN includes a model mimicking a human brain function, built on the basis of the assumption that, when a person recognizes an object, the object is recognized as a result of complex processing in the brain after basic features of the object are extracted.

Meanwhile, the artificial neural network can be trained by adjusting connection weights between nodes (if necessary, adjusting bias values as well) so as to produce a desired output from a given input. Also, the artificial neural network can continuously update the weight values through training. For example, methods such as back propagation may be used in training the artificial neural network.

Meanwhile, the speech recognition device 100 may have an artificial neural network installed therein and may perform machine learning-based user recognition and user voice tone recognition by using speech input signals received as input data.

The controller 190 may have included therein an artificial neural network, such as a deep neural network (DNN) including CNN, RNN, DBN, etc., and may train the DNN. As a machine learning process for these artificial neural networks, both unsupervised learning and supervised learning may be used. The controller 190 may control such that an artificial neural network structure associated with voice tone recognition is updated after training according to settings.

Figure 4:
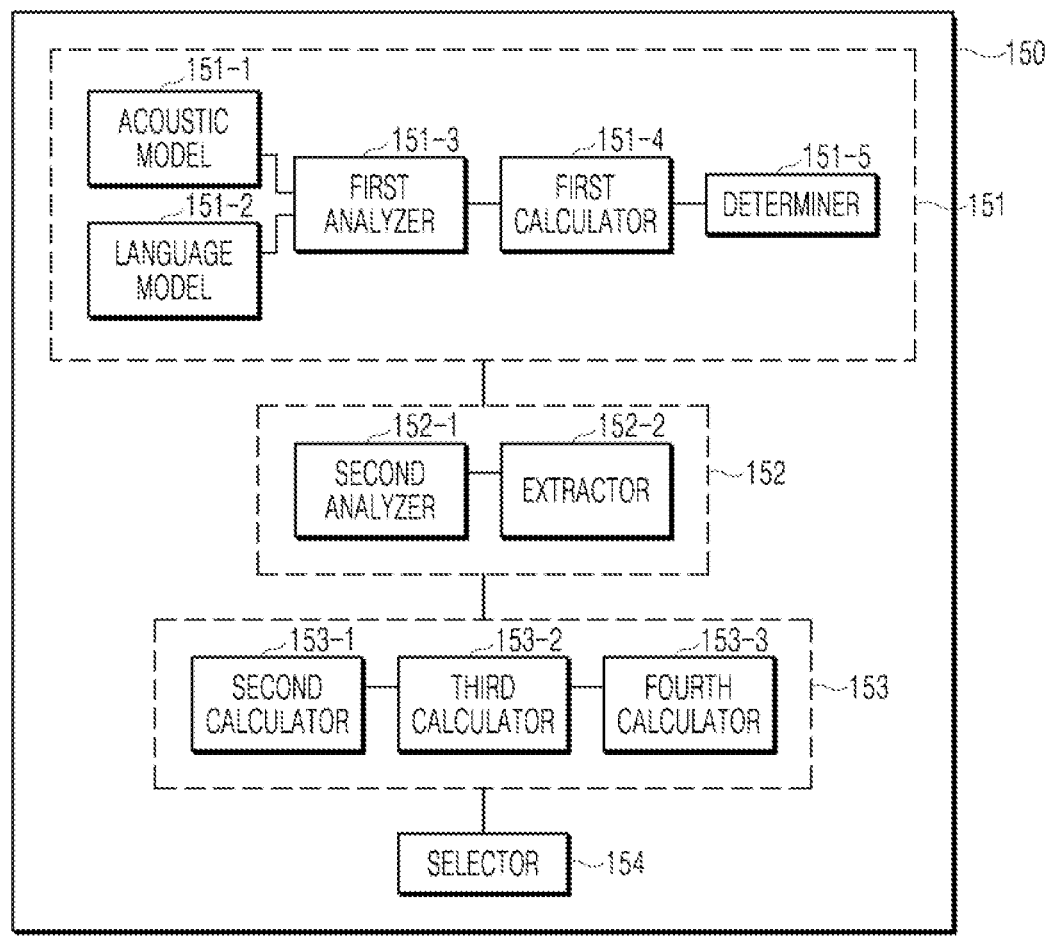
FIG. 4 is a schematic block diagram of a speech processor in the speech recognition device shown in FIG. 3.

FIG. 4 is a schematic block diagram of a speech processor of the speech recognition device shown in FIG. 3, according to an embodiment. In the following description, the parts previously described with reference to FIG. 1 to FIG. 3 will not be described to avoid repetitive description. Referring to FIG. 4, the speech processor 150 according to an embodiment may include the converter 151, the first processor 152, the second processor 153, and the selector 154.

The converter 151 may convert a series of spoken utterance signals inputted through the speech input unit 140 to a text item. In the present embodiment, the converter 151 may include an acoustic model 151-1, a language model 151-2, a first analyzer 151-3, a first calculator 151-4, and a determiner 151-5.

The first analyzer 151-3, by using the acoustic model 151-1 and the language model 151-2, may analyze the pronunciation and context of a word included in a spoken utterance inputted through the speech input unit 140 and extract a candidate word group. Here, the candidate word group may include a plurality of individual candidate words. For example, if the spoken utterance signal is "Yŏngha", the first analyzer 151-3 may extract "Yŏngwa, yŏnga, yŏnghwa, yonghwa, yongha, yonga, etc." as a candidate word group by using the acoustic model 151-1 and the language model 151-2.

Here, the acoustic model 151-1 may include a statistical model of speech that is built through learning on the basis of utterance data of multiple speakers how phonemes (that is, units of sound, e.g. words, syllables, triphones, or smaller parts of speech) are pronounced. For example, the acoustic model 151-1 may include modeling of how the word "엄마" (Eomma, meaning a mother in the Korean language) is to be expressed in sounds, and the acoustic model 151-1 may be stored in the memory 160 and summoned at the time of speech recognition processing. In one embodiment of the present disclosure, the acoustic model 151-1 may include at least one of the following acoustic models: a mel-frequency cepstral coefficient (MFCC) extraction technique, which is the most representative method for estimating energy in a frequency range; a perceptual linear predictive (PLP) technique, which is the most representative technique using a time-based autocorrelation function; and a gammatone cepstral coefficient extraction technique (GTCC, a cepstral coefficient extraction technique using gammatone filter-bank), which is one representative technique of time-frequency analysis techniques. The acoustic model 151-1 is not limited to the aforementioned but may include other acoustic models.

In addition, the language model 151-2 may include an algorithm that finds regularities in grammars, phrases, words, etc. within natural language and applies these regularities to increase the accuracy of a target being searched. Here, commonly used is a statistical modeling technique which calculates probabilities, and this technique expresses language rules as probability values in spoken utterance signals inputted through a large speech corpus and applies these probability values to restrict search areas. Further, this statistical modeling technique not only increases the accuracy in speech recognition, but also dramatically reduces the search space, and since it is based on the probabilistic model of sentences using the probabilistic distribution of all possible sentences, the probabilistic model may need to be learned from training data. Furthermore, as it is known that in most language modeling application areas, N-Gram which is a statistical language model, is known to be the most successful model and therefore, N-Gram may be preferably used in the present disclosure. In the present embodiment, the language model 151-2 may be stored in the memory 160 and may be summoned for speech recognition processing.

The techniques for calculating probabilities, which will be described in the following, are frequently used in statistics and/or speech recognition technology, and more specifically, commonly applied in topic model, opinion mining, text summarization, data analysis, public opinion poll, and the like. Therefore, even without detailed description of the principles involved in the calculation of probabilities, the meaning of the aforementioned will be apparent to those skilled in the art to which the present disclosure pertains.

The first calculator 151-4 may calculate the probability of concordance between a word included in a spoken utterance and a candidate word group extracted on the basis of analysis results from the first analyzer 151-3.

The determiner 151-5 may determine a candidate word with the highest probability of concordance from the candidate word group and convert that candidate word to a text item. As an example in light of the above, given the probability of concordance of each candidate word in the candidate word group (Yŏnghwa—60%, yŏngha—20%, yonghwa—10%, yŏngwa—5%, yŏnga—3%, yonga—2%), the determiner 151-1 may extract the word with the highest probability of concordance (Yŏnghwa). For example, if the spoken utterance signal from the user is "Ach'ime chŏn'gung manŭn chiyŏgi yŏnghagwŏnŭro ttung ttŏrŏjyŏssŏnnŭnde onŭl najedo ssalssarhagetsŭmnida (아침에 전국 많은 지역이 영하권으로 뚝 떨어졌었는데 오늘 낮에도 쌀쌀하겠습니다, [This morning, many regions have dropped to below zero degree Celsius and it's still going to be chilly this afternoon]", the converter 151 may convert this spoken utterance signal to a text item "아침에 전국 많은 지역이 영하권으로 뚝 떨어졌었는데 오늘 낮에도 쌀쌀하겠습니다" through the processing described above.

In the present embodiment, the Korean word "Yŏngha" means "below zero (degrees Celsius)" in English, and is often mispronounced as "Yŏnghwa" and "Yŏnga", which mean a movie and a human infant in the Korean language, respectively. Here, the word "Yŏnghwa" has a similar pronunciation as the word "Yŏngha", but belongs to a completely different domain than "Yŏngha". Likewise, the word "Yŏnga" has a similar pronunciation as the word "Yŏngha", but belongs to a completely different domain from the words "Yŏngha" and "Yŏnghwa".

The processor 152 may extract a discordant named-entity discordant with the parent domain inferred from the text converted by the converter 151. In the present embodiment, the first processor 152 may include a second analyzer and an extractor 152-2.

Here, the domain refers to a predefined category of data that are classified in terms of subject. Examples of the domain include IT, culture/arts, economy, health/medicine, entertainment, and so forth. Each domain may be divided into sub-domains, thereby forming a hierarchical structure. For example, the domains relating to cinema may include entertainment, movies, titles, actors and actresses, staff, theme, relevant dates, and so forth. In some cases, the domain of staff may further have sub-domains, such as directors, scenarios, music, and so forth, and the domain of actors and actresses may have sub-domains, such as lead roles, extra, cameos, and so forth. Also, the parent domain refers to a domain that the converter 151 is able to recognize from an overall converted text item, and for example, if the converted text item converted by the converter 151 is "아침에 전국 많은 지역이 영화권으로 뚝 떨어졌었는데 오늘 낮에도 쌀쌀하겠습니다 (Ach'ime chŏn'gung manŭn chiyŏgi yŏnghwagwŏnŭro ttung ttŏrŏjyŏssŏnnŭnde onŭl najedo ssalssarhagetsŭmnida, [This morning, many regions have dropped to below zero degree Celsius and it's still going to be chilly this afternoon]", then the parent domain would be "weather".

Also, the named-entity may refer to a proper noun having a unique meaning or a number shown in the text item. The named-entity may be broadly classified as name expressions such as person names, location names, organization names, etc., time expressions such as dates, time, etc., and numerical expressions such as monetary values, percentages, etc. Named-entity recognition may relate to extracting such named-entities from documents and classifying the extracted named-entities into categories. A method for such named-entity recognition recognizes named-entities through a vocabulary-based method or a rule-based method, or a machine learning based on technologies such as a RNN, a CNN, and the like. For example, the first processor 152 may extract named-entities, "Kiltong (길동, a person's name)", "Ashiktang (A 식당, restaurant A)", and "chŏnyŏng shiksa (저녁 식사, a dinner)" from the text "길동씨, 이따가 A 식당에서 저녁 식사 할까요 (Kiltongssi, ittaga Ashiktangesŏ chŏnyŏng shiksa halkkayo, [Mr. Kiltong, would you like to have dinner at restaurant A later?])".

The second analyzer 152-1 may analyze one or more named-entities from the text item converted by the converter 151 to infer a parent domain with respect to the text item. The second analyzer 152-1 may infer the parent domain with respect to the text item through comparison between a main named-entity and a word included in a word vocabulary (not illustrated, stored in memory 160) of various parent domains. From the text item converted by the converter 151, for example "Ach'ime chŏn'gung manŭn chiyŏgi yŏnghagwŏnŭro ttung ttŏrŏjyŏssŏnnŭnde onŭl najedo ssalssarhagetsŭmnida", the second analyzer 152-1 may compare words included in vocabulary of various parent domains to main named-entities, "ach'im", "chŏn'guk", "chiyŏk", "yŏngha", "onŭl", "ssalssal", and so forth, to determine that the main named-entities are words included in the vocabulary of the weather domain and infer that the parent domain is "weather".

From the one or more main named-entities extracted by analysis of the text item converted by the converter 151, the extractor 152-2 may extract a named-entity which is discordant in consideration of the parent domain, as a discordant named-entity Here, the discordant named-entity may include a named-entity that is not included in the vocabulary of the parent domain inferred by the second analyzer 152-1. For example, from the text item converted by the converter 151 "아침에 전국 많은 지역이 영화권으로 뚝 떨어졌었는데 오늘 낮에도 쌀쌀하겠습니다 (Ach'ime chŏn'gung manŭn chiyŏgi yŏnghwagwŏnŭro ttung ttŏrŏjyŏssŏnnŭnde onŭl najedo ssalssarhagetsŭmnida, [This morning, many regions have dropped to below zero degree Celsius and it's still going to be chilly this afternoon])", the extractor 152-2 may infer that the parent domain is weather, and may extract "Yŏnghwa (영화, a movie)", which is not included in the vocabulary of the weather domain, as a discordant named-entity.

Based on the calculation of a distance between the term representing the parent domain and each of candidate words associated with the discordant named-entity, the second processor 153 may calculate probabilities with respect to the candidate words associated with the discordant named-entity. In the present embodiment, the second processor 153 may include a second calculator 153-1, a third calculator 153-2, and a fourth calculator 153-3.

The second calculator 153-1 may calculate a distance between the term representing the parent domain and each candidate word associated with the discordant named-entity in a vector space generated by a word embedding method.

Hereinbelow, word embeddings will be described in detail. Word embedding is a text-processing artificial neural network, which may consist of two layers. The word embedding is a technique that seeks to represent a word in a speech corpus as a vector by mapping the word in a vector space where the value of this vector must be a value that can sufficiently represent the meaning or role of the word in the speech corpus. As previously described, the vector representation of a word in the light of the meaning and context of the word may be referred to as word embedding.

In summation, a corresponding vector for each word is obtained, and this vector may be inputted to a deep neural network to learn similarity or other relations between the words or to perform other additional tasks. To understand a sentence based on text, a similarity between words may be obtained. The primary purpose of word embeddings is to find a vector value for each word so that the more similar two words are to each other, the closer they are positioned with respect to each other. This training may be done using speech corpus data only, without human interventions.

Given a sufficient amount of data, word embeddings can acquire the meaning of a word quite accurately. Further, word embeddings may be used not only to acquire the meaning of a word, but also to discover the relations among a number of words. For example, using the relation between words, when given the equation [men:boys=women:x], [x=girls] may be acquired as an answer. Word embeddings may be used not only in classifying words but also in classifying bigger units than words, such as sentences or documents. For example, by using results after clustering documents, the documents can be searched by category (science, law, economy, etc.) on a search engine, and also, sentiment analysis on a sentence, a recommendation system and the like may be made possible.

In accordance with a distance between the term representing the parent domain and each candidate word associated with the discordant named-entity, the third calculator 153-2 may calculate a weight value of each candidate word associated with the discordant named-entity. The third calculator 153-2 may calculate a higher weight value as the distance decreases between the term representing the parent domain and a candidate word associated with the discordant named-entity.

The fourth calculator 153-3 may apply a weight value corresponding to each candidate word associated with the discordant named-entity to calculate an adjusted probability. As previously described, the text item converted by the converter 151 includes a discordant named-entity, and this discordant named-entity is replaced with the text item converted from a discordant named-entity candidate word with the highest probability of concordance among the discordant named-entity candidate words. Accordingly, a probability of each discordant named-entity candidate word may be multiplied by a weight value calculated by the third calculator 153-2 to produce an adjusted probability.

As previously described, for example, the converter 151 may extract a candidate word with the highest probability of concordance (Yŏnghwa) with the word included in the spoken utterance (Yŏngha) from the probabilities of concordance of each candidate word (Yŏnghwa—60%, yŏngha—20%, yonghwa—10%, yŏngwa—5%, yŏnga—3%, yonga—2%). Subsequently, in the first processor 152, this word (Yŏnghwa) is discordant with the parent domain (weather) and thus extracted as a discordant named-entity. The second processor 153 may calculate a distance between the term representing the parent domain (weather) and each candidate word associated with the discordant named-entity (Yŏnghwa, yŏngha, yonghwa, yŏngwa, yŏnga, and yonga) in a vector space generated by a word embedding method; may calculate, according to the distance, a weight value with respect to each candidate word associated with the discordant named-entity (Yŏnghwa, yŏngha, yonghwa, yŏngwa, yŏnga, and yonga); and may multiply the calculated weight value by a previously obtained probability to calculate an adjusted probability with respect to each of the discordant named-entity candidate words (Yŏnghwa—37%, yŏngha—45%, yonghwa—18%, yŏngwa—0%, yŏnga—0%, yonga—0%).

Based on the probabilities calculated by the second processor 153 (adjusted probabilities), the selector 154 may select the discordant named-entity in the text item as one of the candidate words associated with the discordant named-entity, and may modify the discordant named-entity in the text item to a candidate word associated with the discordant named-entity that has the highest probability calculated by the second processor 153 (adjusted probability). From the example previously described, the selector 154 may modify the discordant named-entity "Yŏnghwa" to the discordant named-entity candidate word with the highest adjusted probability, "Yŏngha".

As previously described, according to resulting probabilities calculated based on word embeddings, the named-entity in a sentence that is discordant with the parent domain may be modified to the named-entity discordant with the parent domain to improve speech recognition processing performance.

Figure 5:
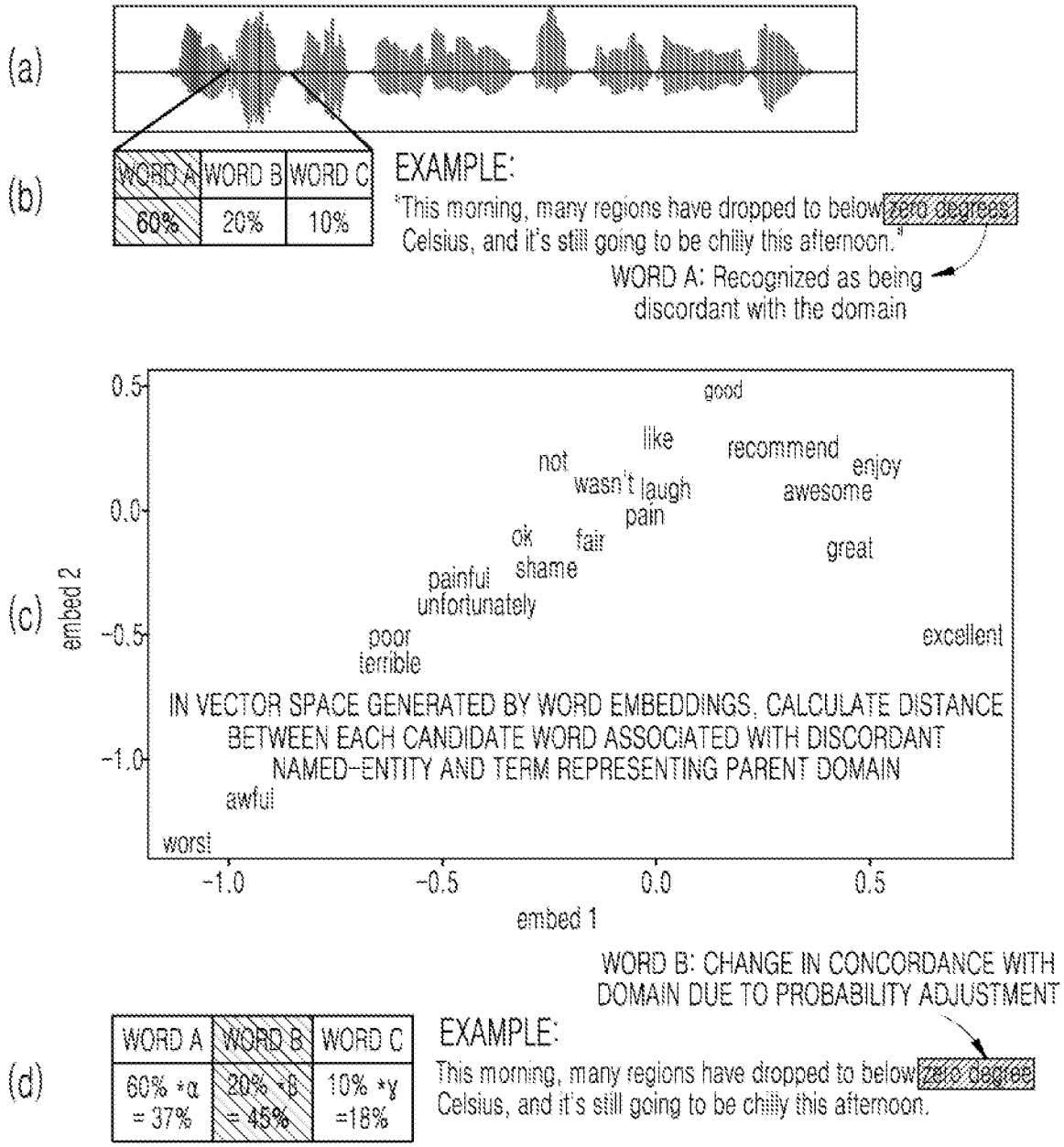
FIG. 5 is a diagram illustrating the operation of the speech processor shown in FIG. 4, in response to a spoken utterance from a user.

FIG. 5 is a diagram illustrating an operation of the speech processor of FIG. 4 in response to a spoken utterance of a user. Hereinbelow, a repetitive description of the common parts previously described with reference to FIG. 1 to FIG. 4 will be omitted. Referring to FIG. 5, a series of spoken utterance signals inputted through the speech input unit 140 in FIG. 5A may be, for example, "Ach'ime chŏn'gung manŭn chiyŏgi yŏnghwagwŏnŭro ttung ttŏjyŏssŏnnŭnde onŭl najedo ssalssarhagetsŭmnida".

FIG. 5B illustrates an example in which, as a series of spoken utterance signals inputted through the speech input unit 140 are converted to a text item, candidate words are extracted, and among the candidate words, a candidate word with the highest probability of concordance is selected and converted to a text item. Word A, Word B, and Word C shown in FIG. 5B may be candidate words associated with a discordant named-entity within the text item that is discordant with the parent domain, and as illustrated in the example previously described, Word A may be Yŏnghwa—60%, Word B may be yŏngha—20%, and Word C may be yonghwa—10%.

FIG. 5C illustrates the results of calculating distances between the term representing the parent domain (weather) and each of candidate words associated with the discordant named-entity (Yŏnghwa, yŏngha, yonghwa, yŏngwa, yŏnga, yonga) in a vector space generated by a word embedding method, where a higher weight value may be applied for a smaller distance between the term representing the parent domain and the candidate word associated with the discordant named-entity.

FIG. 5D shows adjusted probabilities that are adjusted by multiplying the previous probabilities of the candidate words associated with the discordant named-entity by the weight values. Further, FIG. 5D shows that from the example previously described, the candidate words are adjusted such that Word A is Yŏnghwa—37%, Word B is Yŏngha—45%, and Word C is Yŏnghwa—18%, and accordingly, the original discordant named-entity "Yŏnghwa" is modified to the candidate word with the highest adjusted probability, "Yŏngha". For example, the final text item may be modified to "아침에 전국 많은 지역이 영하권으로 뚝 떨어졌었는데 오늘 낮에도 쌀쌀하겠습니다".

Figure 6:
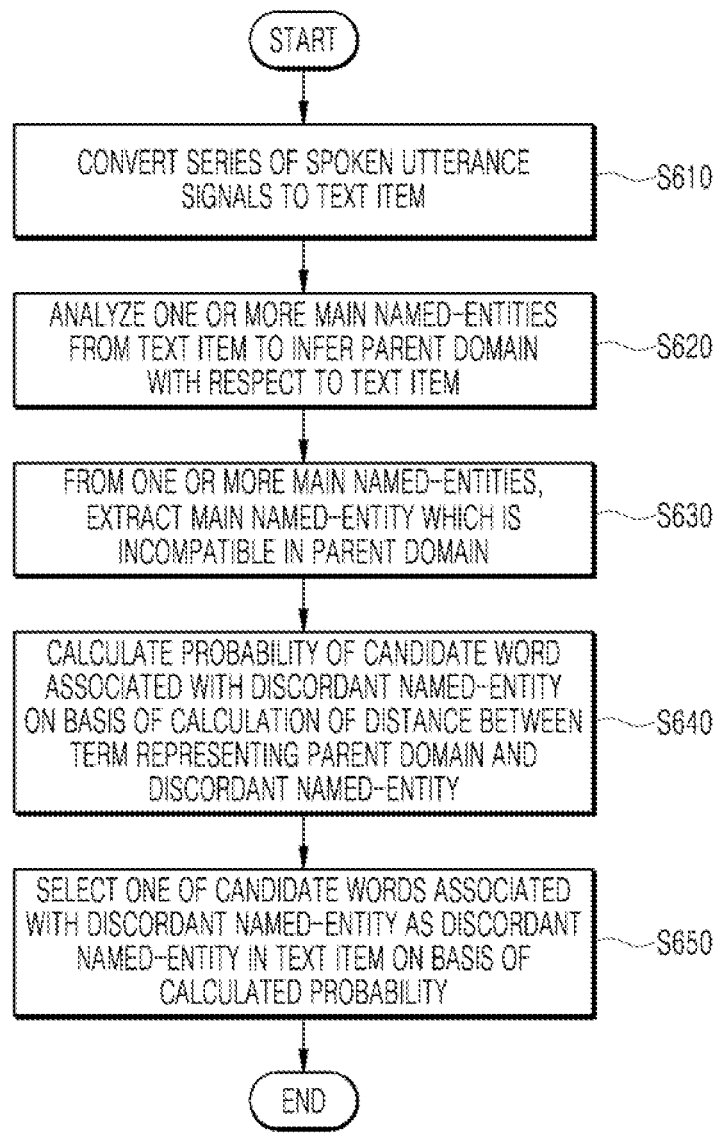
FIG. 6 is a schematic block diagram of a speech recognition device according to an embodiment of the present disclosure.

FIG. 6 is a flowchart of a speech recognition method according to an embodiment of the present disclosure. Hereinbelow, a description of the common parts previously described with reference to FIG. 1 to FIG. 5 will be omitted to avoid repetitive description.

Referring to FIG. 6, in step S610, the speech recognition device 100 converts a series of inputted spoken utterance signals to a text item. The speech recognition device 100 may analyze the pronunciation and context of a word included in an inputted spoken utterance by using previously stored acoustic model and language model to extract candidate words; may calculate probabilities of concordance between each of the extracted candidate words and the word included in the spoken utterance; and may select a candidate word with the highest probability of concordance among the candidate words and convert the same to a text item.

In step S620, the speech recognition device 100 may analyze one or more main named-entities in the converted text item to infer a parent domain with respect to the text item. The speech recognition device 100 may compare the main named-entities to words included in the vocabulary of various parent domains to infer the parent domain with respect to the text item.

In step S630, from among the one or more main named-entities extracted through analysis of the converted text item, the speech recognition device 100 extracts, as a discordant named-entity, a main named-entity that is at odds with a context of the parent domain. Here, the discordant named-entity may include a named-entity that is not included in the vocabulary of the parent domain inferred by the second analyzer 152-1.

In step S640, based on the resulting distances calculated between the term representing the parent domain and each candidate word associated with the discordant named-entity, the speech recognition device 100 may calculate a probability of each candidate word associated with the discordant named-entity. The speech recognition device 100 may calculate the distance between the term representing the parent domain and each candidate word associated with the discordant named-entity in a vector space generated by word embeddings. The speech recognition device 100 may calculate different weight values depending on a distance between the term representing the parent domain and each candidate word associated with the discordant named-entity, and may calculate a higher weight value for a smaller distance between the term representing the parent domain and each candidate word associated with the discordant named-entity. The speech recognition device 100 may apply a weight value corresponding to each candidate word associated with the discordant named-entity to calculate an adjusted probability. As previously described, the text item converted by the converter 151 includes a discordant named-entity, and this discordant named-entity is the text item converted from a discordant named-entity candidate word with the highest probability of concordance among the discordant named-entity candidate words. Accordingly, the probability of each discordant named-entity candidate word may be multiplied by the weight value calculated based on the distance to produce the adjusted probability.

In step S650, the speech recognition device 100 may select one of the candidate words associated with the discordant named-entity as the discordant named-entity in the text item on the basis of the calculated probabilities (adjusted probabilities). Here, the speech recognition device 100 may modify the discordant named-entity in the text item to a candidate word associated with the discordant named-entity with the highest calculated probability (adjusted probability).

The embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A speech recognition method by a speech recognition device, comprising:
    converting a series of spoken utterance signals to a text item;
    extracting a discordant named-entity discordant with a parent domain inferred from the text item;
    calculating probabilities for candidate words associated with the discordant named-entity, based on calculation of distances between each candidate word associated with the discordant named-entity and a term representing the parent domain; and
    modifying, based on the calculated probabilities, the discordant named-entity in the text item to one candidate word among the candidate words associated with the discordant named-entity, wherein the extracting includes:
inferring the parent domain with respect to the text item by analyzing one or more main named-entities in the text item; and
extracting, from the one or more main named-entities, a main named-entity that is at odds with a context of the parent domain, as the discordant named-entity,
wherein the extracting the main named-entity includes comparing the one or more main named-entities to a word in a vocabulary of the parent domain and extracting, as the discordant named-entity, a main named-entity that is not included in the vocabulary of the parent domain,
wherein the calculating probabilities includes:
calculating a distance between the term representing the parent domain and each candidate word associated with the discordant named-entity in a vector space generated by a word embedding method;
calculating a weight value of each candidate word associated with the discordant named-entity according to the corresponding distance; and
applying the weight value of each candidate word associated with the discordant named-entity to a corresponding candidate word to calculate an adjusted probability of each candidate word,
wherein the calculating a weight includes producing a higher weight value for a candidate word associated with the discordant named-entity as the distance between the candidate word associated with the discordant named-entity and the term representing the parent domain decreases.

2. The speech recognition method of claim 1, wherein the converting includes:
extracting the candidate words by analyzing a pronunciation and a context of a word included in a spoken utterance, using an acoustic model and a language model;
calculating probabilities of concordance between each candidate word and the word included in the spoken utterance; and
determining a candidate word with the highest probability of concordance and converting the candidate word with the highest probability to the text item.

3. The speech recognition method of claim 1, wherein the modifying includes modifying the discordant named-entity in the text item to a candidate word with the highest adjusted probability selected from the candidate words associated with the discordant named-entity.

4. A computer program stored in a non-transitory recording medium readable by a computer, for permitting the speech recognition method of claim 1 to be executed by using the computer.

5. A speech recognition device configured to recognize a series of spoken utterance signals, the speech recognition device comprising:
a converter configured to convert the series of spoken utterance signals to a text item;
a first processor configured to extract a discordant named-entity discordant with a parent domain inferred from the text item;
a second processor configured to calculate, based on calculation of a distance between a term representing the parent domain and each candidate word associated with the discordant named-entity, probabilities with respect to each candidate word associated with the discordant named-entity; and
a selector configured to modify, based on the calculated probabilities, the discordant named-entity in the text item to one candidate word selected from the candidate words associated with the discordant named-entity,
wherein the first processor includes:
a second analyzer configured to analyze one or more main named-entities from the text item to infer the parent domain with respect to the text item; and
an extractor configured to extract, as the discordant named-entity, from the one or more main named-entities, a main named-entity that is at odds with a context of the parent domain,
wherein the extractor is configured to compare words in a vocabulary of the parent domain to the one or more main named-entities and extract, as the discordant named-entity, a main named-entity not included in the vocabulary of the parent domain, and
wherein the second processor includes:
a second calculator configured to calculate a distance between the term representing the parent domain and each candidate word associated with the discordant named-entity in a vector space generated by a word embedding method;
a third calculator configured to calculate, based on the distance, a weight value with respect to each candidate word associated with the discordant named-entity; and
a fourth calculator configured to apply the weight value to each corresponding candidate word associated with the discordant named-entity to produce an adjusted probability with respect to each candidate word associated with the discordant named-entity,
wherein the third calculator is configured to produce a higher weight value for a candidate word associated with the discordant named-entity as the distance between the candidate word associated with the discordant named-entity and the term representing the parent domain decreases.

6. The speech recognition device of claim 5, wherein the converter includes:
a first analyzer configured to extract candidate words by analyzing pronunciation and context of a word included in the spoken utterance using an acoustic model and a language model;
a first calculator configured to calculate a probability of concordance between each candidate word and the word included in the spoken utterance; and
a determiner unit configured to determine a candidate word with the highest probability of concordance from among the candidate words, and to convert the candidate word with the highest probability to the text item.

7. The speech recognition device of claim 5, wherein the selector is configured to modify the discordant named-entity in the text item to a candidate word associated with the discordant named-entity having the highest adjusted probability.

* * * * *